May 1, 1945.  W. J. KANIHAN  2,375,112
RIVET REMOVER
Filed Nov. 13, 1943

INVENTOR
Wm. J. Kanihan
BY
ATTYS

Patented May 1, 1945

2,375,112

UNITED STATES PATENT OFFICE 2,375,112

RIVET REMOVER

William J. Kanihan, Sacramento, Calif.

Application November 13, 1943, Serial No. 510,141

4 Claims. (Cl. 77—55)

This invention relates generally to a rivet remover which is operative to drill out the shank of a rivet whereby to permit of separation of the parts secured by said rivet, as for example the removal of rivets from airplane structures as necessary for repair of the latter.

In particular the invention is directed to, and it is an object to provide, a rivet remover which includes novel means to guide the drill rod and to center the same relative to the rivet to be removed, whereby to assure of correct drill rod alinement and proper drilling out of the rivet shank without drifting and resultant malformation of the matching rivet holes in the connected parts.

A further object of this invention is to provide a rivet remover, as in the preceding paragraph, which includes a spring-pressed drill rod guide whose outer end matchingly seats on the head of the rivet to be removed.

An additional object is to provide a rivet remover which includes a removable drill rod guide so that guides, corresponding to drill rods of different sizes, and rivets of different head sizes, can be used.

It is also an object to provide a rivet remover which is fast but accurate in operation.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
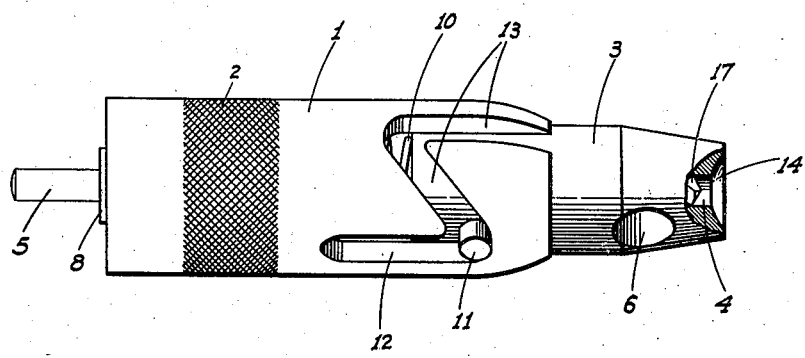
Figure 1 is a side elevation of the device.
Figure 2:
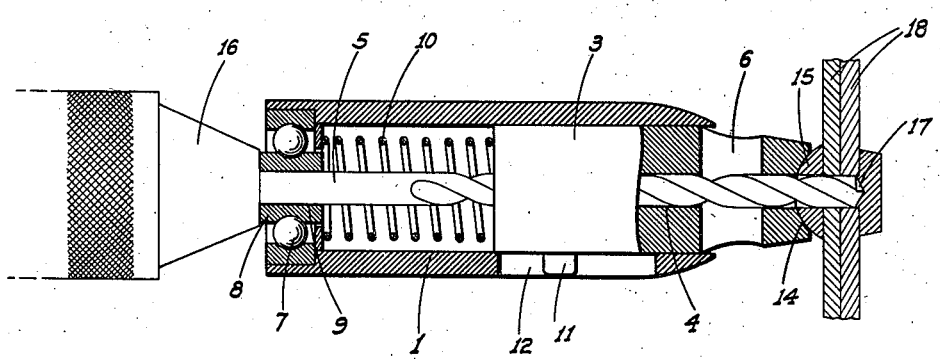
Figure 2 is a side elevation, mainly in section, showing the device in use.

Referring now more particularly to the characters of reference on the drawing, the numeral 1 indicates a sleeve knurled externally as at 2 for hand engagement and fitted at one end with a removable drill rod guide 3 which is cylindrical and projects part way into said sleeve with a close running fit; said guide being formed with an axial bore 4 through which a drill rod 5 may extend in guided relation. Toward their forward ends both the sleeve 1 and guide are externally tapered as shown for convenience of use.

The extent of projection of guide 3 forwardly relative to sleeve 1 is greater than the length of any rivet to be removed, and adjacent its forward end the guide 3 is formed with a relatively large cross opening 6 which intersects bore 4 to permit drill shavings to freely escape from the device.

A combination annular and thrust bearing unit 7 is press-fitted into the rear end of sleeve 1; the inner race 8 of said bearing unit having a bore 9 through which the drill rod 5 projects, the drill rod in the present embodiment being of the maximum diameter usable in the particular tool shown.

A normally loaded compression spring 10 is engaged between adjacent ends of the drill rod guide 3 and bearing unit 7 in surrounding relation to the drill rod 5; such spring urging the guide forwardly relative to the sleeve 1. This forward movement of the guide 3 relative to sleeve 1 is limited by a radially projecting pin 11 which rides in a longitudinal slot 12 cut in said sleeve. Access of the pin 11 to the slot 12, to permit of use of different guides 3, is by means of a bayonet slot 13 open at its inner end to slot 12 and open at its outer end to the forward end of sleeve 1.

The forward end of sleeve 1 is concave, as at 14, with such concavity formed to match the head 15 of a rivet to be removed.

In use of the above described device, the rear end of the drill rod 5 is engaged in the chuck of a hand drill and with said chuck seating on or running against the inner race 8 of bearing unit 7; the drill rod being of such length that initially its point 17 is adjacent but short of concave seat 14, as shown in Fig. 1.

The seat 14 is then matchingly engaged on the head 15 of the rivet, and then the chuck 16 is advanced, which also advances the drill rod 5, causing the latter to project outwardly through the seat 14 and bore through the rivet. The drill rod is of a size to completely drill out the shank of the rivet, whereupon the initially connected parts 18 can be separated. During the drilling operation, the spring 10 maintains seat 14 firmly against rivet head 15.

The guide 3 is removable so that other guides, having different shapes or sizes of rivet-head seats, or different bores for the drill, may be interchangeably used with the one sleeve or body 1.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A guide and locator for a chucked drill rod comprising a sleeve, a cylindrical guide slidable axially in one end portion of the sleeve and projecting outwardly therefrom, the guide having a work engaging recess formed in its outer end and a drill rod guiding axial bore opening into said recess, the sleeve being fitted at its other end with a rotary chuck engaging element, a compression spring disposed in the sleeve and urging the guide outwardly, and means to limit such movement of the guide; there being a bearing unit fitted in said other end of the sleeve and said rotary element comprising the inner race of the unit, said race having an axial bore therethrough.

2. A guide and locator for a chucked drill rod comprising a sleeve, a cylindrical guide slidable axially in one end portion of the sleeve and projecting outwardly therefrom, the guide having a work engaging recess formed in its outer end and a drill rod guiding axial bore opening into said recess, a bearing unit fitted into the other end of the sleeve and including an inner rotary race having a bore through which the drill rod passes and against which race the chuck seats, a compression spring in the sleeve between said bearing unit and guide urging the latter outwardly, and means to limit such movement of the guide.

3. A guide and locator for a chucked drill rod comprising a sleeve, a cylindrical guide slidable axially in one end portion of the sleeve and projecting outwardly therefrom, the guide having a work engaging recess formed in its outer end and a drill rod guiding axial bore opening into said recess, a bearing unit fitted into the other end of the sleeve and including an inner rotary race having a bore through which the drill rod passes and against which race the chuck seats, a compression spring in the sleeve between said bearing unit and guide urging the latter outwardly, and a radial pin on the guide, the sleeve having a longitudinal slot in which said pin rides.

4. A guide and locator for a chucked drill rod comprising a sleeve, a cylindrical guide slidable axially in one end portion of the sleeve and projecting outwardly therefrom, the guide having a work engaging recess formed in its outer end and a drill rod guiding axial bore opening into said recess, a bearing unit fitted into the other end of the sleeve and including an inner rotary race having a bore through which the drill rod passes and against which race the chuck seats, a compression spring in the sleeve between said bearing unit and guide urging the latter outwardly, and a radial pin on the guide, the sleeve having a longitudinal slot in which said pin rides; said guide being initially separate and removable from the sleeve, the latter including a bayonet slot arranged to normally prevent escape of said pin from the pin slot, but to permit such escape upon predetermined manipulation of the guide.

WILLIAM J. KANIHAN.